US012608856B2

(12) United States Patent
Engman et al.

(10) Patent No.: US 12,608,856 B2
(45) Date of Patent: Apr. 21, 2026

(54) SYSTEM FOR AND METHOD OF GRAPHICALLY REPRESENTING INFORMATION

(71) Applicant: DTN, LLC, Omaha, NE (US)

(72) Inventors: Carl Ragnar Engman, Woodbury, MN (US); Fraser Allen Scheibe, Otsego, MN (US); Thomas Allen Redington, Omaha, NE (US)

(73) Assignee: DTN, LLC, Bloomington, MN (US)

( * ) Notice: Subject to any disclaimer, the term of this patent is extended or adjusted under 35 U.S.C. 154(b) by 128 days.

(21) Appl. No.: 17/988,499

(22) Filed: Nov. 16, 2022

(65) Prior Publication Data

US 2023/0177750 A1     Jun. 8, 2023

Related U.S. Application Data

(60) Provisional application No. 63/279,796, filed on Nov. 16, 2021.

(51) Int. Cl.
*G06T 11/20*     (2006.01)
*G06Q 40/06*     (2012.01)

(52) U.S. Cl.
CPC ............ *G06T 11/206* (2013.01); *G06Q 40/06* (2013.01)

(58) Field of Classification Search
None
See application file for complete search history.

(56) References Cited

U.S. PATENT DOCUMENTS

2007/0050273 A1     3/2007  Burke, Jr.
2012/0150716 A1*    6/2012  Bark ...................... G06Q 40/06
                                                         705/37

2013/0138477 A1*    5/2013  Wilkins ............. G06Q 30/0629
                                                         705/7.29
2015/0154700 A1*    6/2015  Hackett .................. G06Q 40/04
                                                         705/37
2019/0244256 A1*    8/2019  Karlsson ............ G06Q 30/0275
2020/0273104 A1*    8/2020  Ushman ............. G06Q 30/0206
2021/0256743 A1     8/2021  Schneider
2021/0390623 A1*   12/2021  Todoriki ................ G06Q 40/06

FOREIGN PATENT DOCUMENTS

KR    10-2017-0063446 A    6/2017
KR    10-2018-0047737 A    5/2018
WO         2021145722 A1   7/2021

OTHER PUBLICATIONS

"International Search Report and Written Opinion Received for International Patent Application No. PCT/US2022/050131, Search completed on May 9, 2023, Mailed on May 9, 2023.", 8 Pages.

* cited by examiner

*Primary Examiner* — Anh-Tuan V Nguyen
(74) *Attorney, Agent, or Firm* — Kutak Rock LLP; Brian L. Main

(57)     ABSTRACT

A system for and method of generating and providing graphical representations of historical financial information is provided. The graph includes a band that is separated into upper and lower portions, each portion being bounded by a middle boundary and respective upper and lower boundaries. The middle boundary provides a graphical representation of historical close values, and the upper and lower boundaries provide graphical representations of historical high and low daily values, respectively. The band is augmented with additional graphical representations of information, thereby providing additional context and clarity for the information represented.

13 Claims, 7 Drawing Sheets

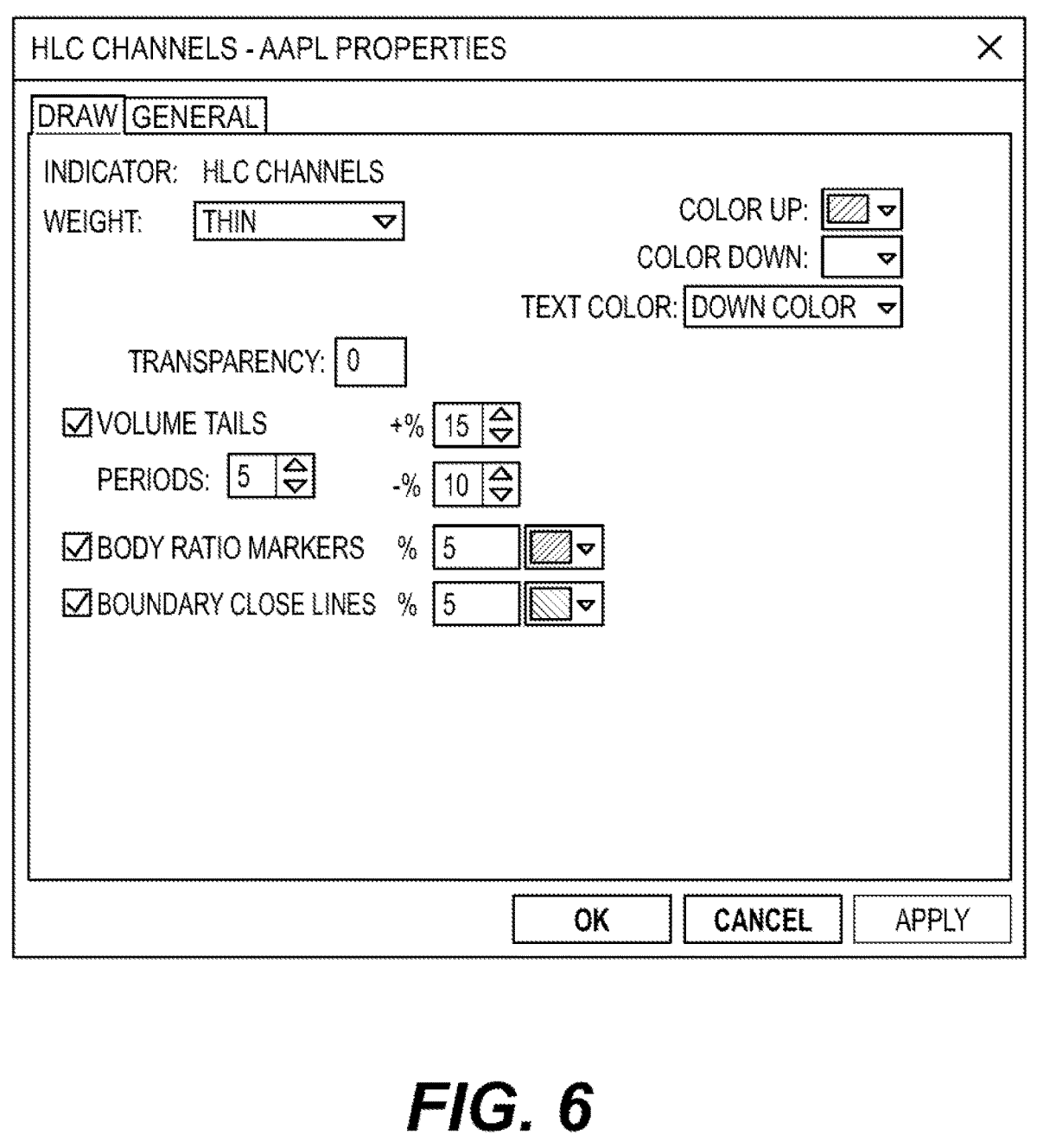

HLC CHANNELS - AAPL PROPERTIES                                          ✕

DRAW GENERAL

INDICATOR:   HLC CHANNELS
WEIGHT:        THIN            ▽              COLOR UP: [▨] ▽
                                             COLOR DOWN: [  ] ▽
                                       TEXT COLOR: DOWN COLOR ▽

TRANSPARENCY: 0

☑ VOLUME TAILS        +% [15] ⬍
        PERIODS: [5] ⬍    -% [10] ⬍
    ☑ BODY RATIO MARKERS   % [5]  [▨] ▽
    ☑ BOUNDARY CLOSE LINES % [5]  [▨] ▽

OK        CANCEL      APPLY

FIG. 6

SYSTEM FOR AND METHOD OF GRAPHICALLY REPRESENTING INFORMATION

CROSS-REFERENCE TO RELATED APPLICATIONS

This application claims priority pursuant to 35 U.S.C. 119 (e) to U.S. Provisional Patent Application Ser. No. 63,279, 796, filed Nov. 16, 2021, the entire disclosure of which is incorporated herein by reference.

FIELD OF THE INVENTION

The present invention relates generally to graphical representation of information. More specifically, the present invention is concerned with graphical representation of data trends.

BACKGROUND

With so much information being available today, ingesting and understanding such information can be difficult and time consuming. Traditionally, graphical representations of information have been used to assist with ingestion and understanding of large amounts of information. Unfortunately, traditional methods of graphical representation are limited in how much information can be provided and how such information can be conveyed, especially when the desired information is relational information (such as data trends and data comparisons) associated with a plurality of discrete data values. Accordingly, it would be beneficial to have a new method of displaying information. Furthermore, it would be beneficial if the new method of displaying information facilitated displaying data trends and/or data comparisons. Furthermore still, it would be beneficial if the new method of displaying information facilitated simultaneous display of data trends, data comparisons, and the associated data values.

Referencing FIG. 1A, a bar graph is a popular means for conveying information, such as historical price information for commodities. In the example shown, the horizontal and vertical axes represent time and price, respectively, each vertical bar represents a price range for a respective day, each horizontal bar to the left of a vertical bar represents an opening price, and each horizontal bar to the right of the vertical bar represents a closing price. While these bar graphs provide graphical representations of several discrete data values, associated relational information can be difficult or impossible to ascertain. For instance, a user must focus on an individual bar to determine whether a given day closed near a high or a low. Furthermore, a user must inspect each bar and compare it with surrounding bars to determine any potential trends of closing near a high or a low, making it difficult or impossible to obtain a reliable understanding of the various data trends that may exist Referencing FIG. 1B, a candlestick graph is another popular means for conveying historical price information. Like bar graphs, a candlestick graph displays information for distinct and separate sequential days. This format makes it difficult or impossible to ascertain certain important relational information. Accordingly, it would be beneficial to have a new graph that displays relational information in a manner that facilitates a user's ability to ascertain and understand such information.

Other graphs, such as line graphs, can be used to provide some relational information, such as some data trends, but the scope and variety of information provided by existing graph options is limited. Furthermore, existing graphs, such as line graphs that plot a single data trend, exclude additional information (such as additional data trends or other relational information and/or related discrete data values) that may be necessary to fully represent the importance of various features of such graphs. Accordingly, it would be beneficial to have a new graph option that facilitates simultaneous display a large scope and/or variety of relational information. Furthermore, it would be beneficial if the new graph option facilitated simultaneous display of relational information with associated discrete data values.

SUMMARY

The present invention comprises a system for and a method of presenting information in a unique way. In some embodiments, the present invention includes producing a graphical representation of a variety of information and presenting the same in a manner that facilitates a user's ability to ascertain and understand such information, such as by presenting the information as part of a graph of the present invention. In some such embodiments, a graph of the present invention displays relational information associated with a plurality of discrete data values. In some embodiments, the graph simultaneously displays relational information with associated discrete data values.

In some embodiments, the graph of the present invention includes a band divided into upper and lower portions. When utilized to convey market information, upper and lower boundaries of the band represent daily high and low prices, respectively. In some such embodiments, daily close prices are represented by a middle boundary separating the upper and lower portions of the band. In this way, the thickness of the upper and lower portions varies along a length of the band, thereby representing data trends in a manner that is readily ascertainable and easily understandable.

In some embodiments, the graph of the present invention includes graphical representations of various relational information and/or discrete data. In some such embodiments, the graph includes close lines, body markers, volume tails, and the like. In some embodiments, each close line represents the occurrence of a certain number of consecutive close values that meet selected criteria, such as being within a certain range of a significant value, such as a daily high value, a daily low value, or the like. In some embodiments, each body marker represents the occurrence of a close value that meets selected criteria, such as being within a certain range of a significant value, such as a daily open value. In some embodiments, each volume tail represents a daily volume that exceeds or falls below a certain threshold value, such as exceeding or falling below a certain percentage of a three-month average daily trade volume.

The foregoing and other objects are intended to be illustrative of the invention and are not meant in a limiting sense. Many possible embodiments of the invention may be made and will be readily evident upon a study of the following specification and accompanying drawings comprising a part thereof. Various features and subcombinations of invention may be employed without reference to other features and subcombinations. Other objects and advantages of this invention will become apparent from the following description taken in connection with the accompanying drawings, wherein is set forth by way of illustration and example, an embodiment of this invention and various features thereof.

BRIEF DESCRIPTION

Embodiments of the present invention are described in detail below with reference to the attached drawing figures, wherein:

FIG. 6 shows a settings menu of an embodiment of the present invention, the settings menu for adjusting a plurality of parameters of the graphical representations.

Figure 1A:
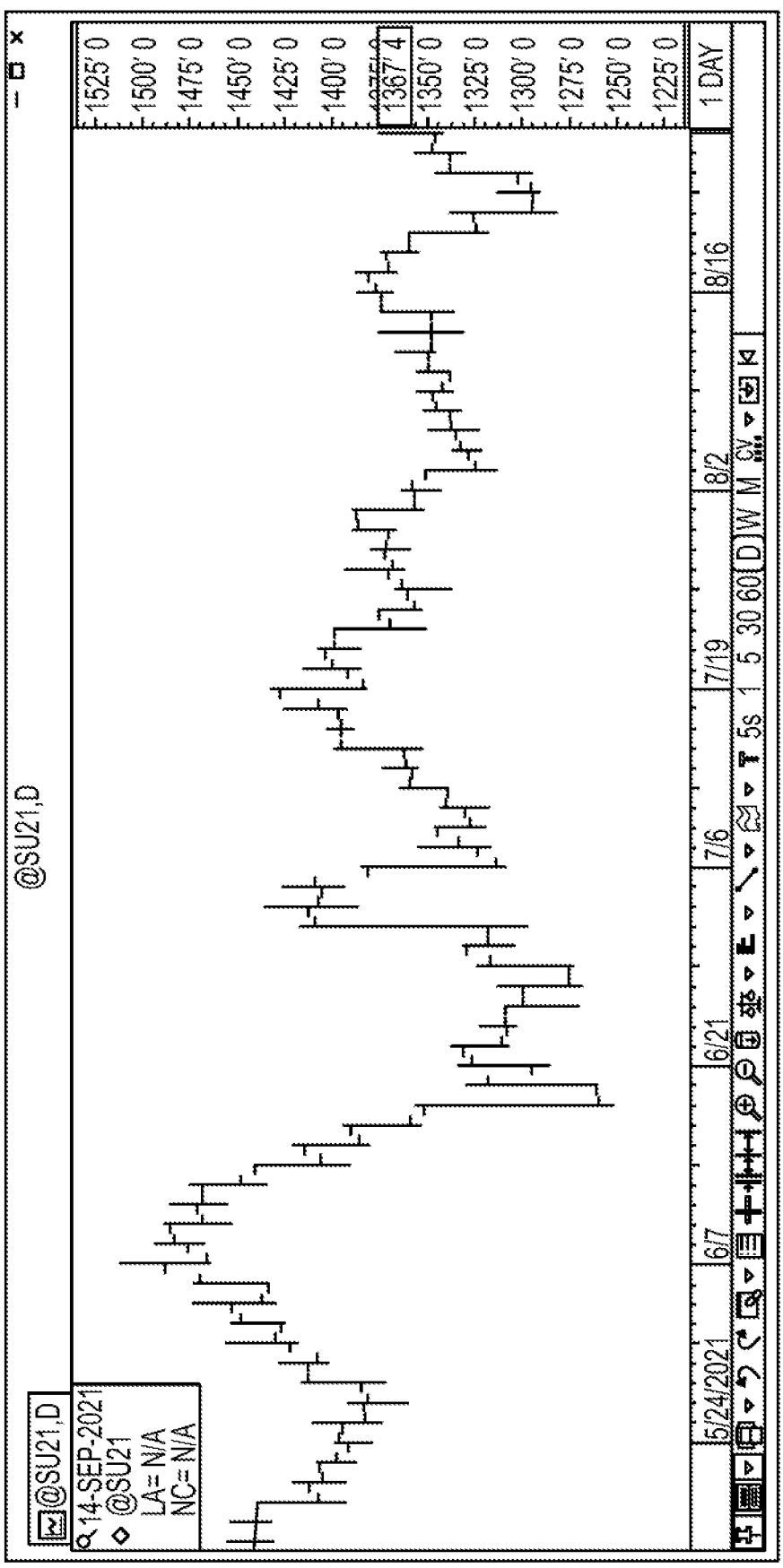
FIG. 1A shows a bar chart of the prior art.
Figure 1B:
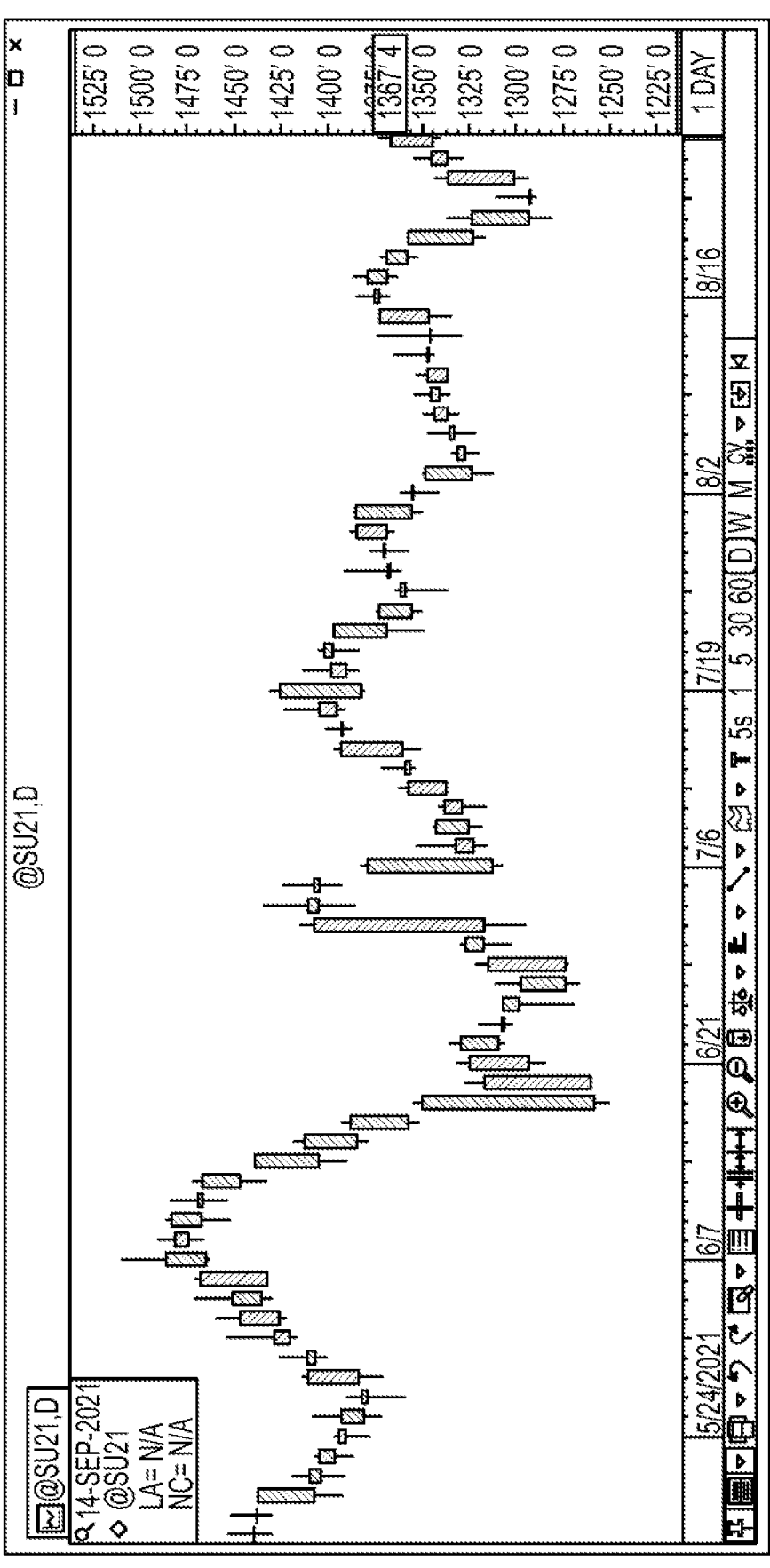
FIG. 1B shows a candlestick chart of the prior art.

The drawing figures do not limit the present invention to the specific embodiments disclosed and described herein. The drawings are not necessarily to scale, emphasis instead being placed upon illustrating the principles of the invention.

DETAILED DESCRIPTION

As required, a detailed embodiment of the present invention is disclosed herein; however, it is to be understood that the disclosed embodiment is merely exemplary of the principles of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 2:
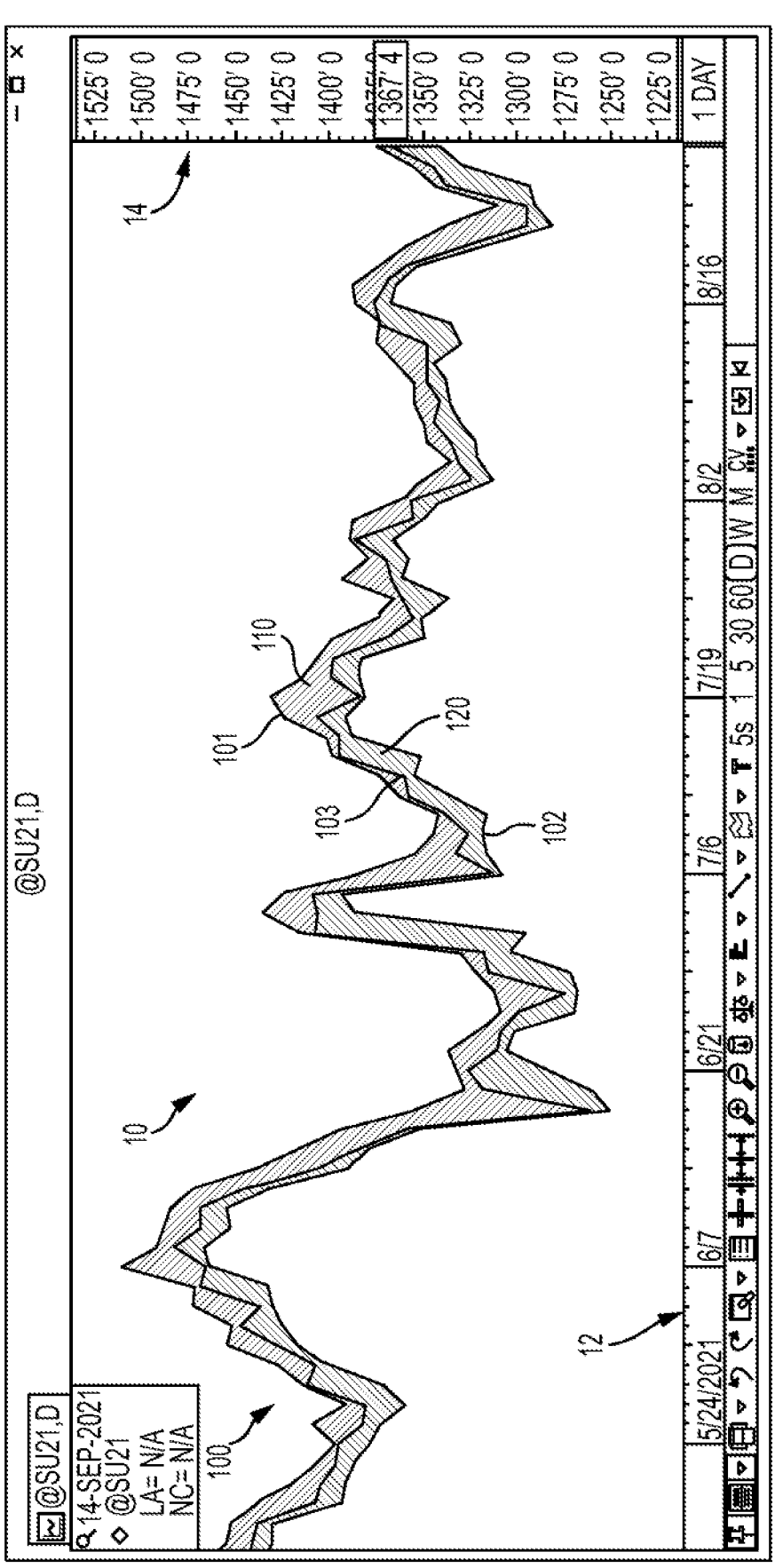
FIG. 2 shows a graph of an embodiment of the present invention, the graph having a band that is divided into upper and lower portions.

Referring to FIG. 2, the present invention includes a system for and a method of providing a graphical representation of information. In the embodiment shown, the graphical representation includes a band 100 divided into first 110 and second 120 portions. The band 100 is positioned on a plot area 10, the first portion 110 being positioned above the second portion 120. In some embodiments, the first 110 and second 120 portions are respective first and second colors, and the plot area 10 is a third color. In some such embodiments, the first and second colors are each readily distinguishable from the third color, and the first and second colors are readily distinguishable from each other. In this way, upper 101, lower 102, and middle 103 boundaries of the band 100 are readily apparent such that data trends, or other relational information, is readily ascertainable.

The plot area 10 includes first 12 and second 14 axes for displaying respective first and second categorical information. In some embodiments, the first categorical information is time, and the second categorical information is historical price information, such as historical commodity prices. In some embodiments, one or more of the first 12 and second 14 axes includes incremental values and periodic marks associated therewith, thereby providing a visual representation indicating the scale of the various elements of the band 10. In some embodiments, the first axis 12 is a horizontal axis, the second axis 14 is a vertical axis, and the plot area represents an infinite number of intersect points associated with the first 12 and second 14 axes.

The second axis 14 is scaled to show a plurality of dates (or other increment of time, each herein a "date"), and the first axis 12 is scaled to show each high and low value associated with the plurality of dates. In this way, the plot area 10 is scaled to show a plurality of high and low values associated with a desired time range.

The upper boundary 101 passes through each high value in the time range, thereby providing a graphical representation of the various high values. Furthermore, the upper boundary 101 extends from each high value in the time range to each subsequent high value in the time range, thereby providing a graphical representation of trends associated with the high values. For instance, positive and negative slopes represent increasing and decreasing values, respectively, such that long segments of positive or negative slopes represent a relatively consistent trend. By contrast, short segments of abrupt or extreme transitions between positive and negative slopes represents potential volatility or other lack of consistent trends.

The lower boundary 102 passes through each low value in the time range, thereby providing a graphical representation of the various low values. Furthermore, the lower boundary 102 extends from each low value in the time range to each subsequent low value in the time range, thereby providing a graphical representation of trends associated with the low values. By comparing the upper 101 and lower 102 boundaries to each other, additional information can be ascertained. For instance, the thickness of the band 10 varies based on the relative values of the upper 101 and lower 102 boundaries. Thinner regions of the band 10 represent minimal daily fluctuations while thicker regions of the band represent large daily fluctuations.

The middle boundary 103 passes through each of a plurality of close values in the time range, thereby providing a graphical representation of the various close values. Furthermore, the middle boundary 103 extends from each close value in the time range to each subsequent close value in the time range, thereby providing a graphical representation of trends associated with the close values. In this way, the middle boundary 103 divides the band 10 into upper 110 and lower 120 portions. By comparing the upper 110 and lower 120 portions to each other, additional information can be ascertained. For instance, the relative thicknesses of the upper 110 and lower 120 portions provide a visual indication of whether close values tend to be near respective high or low values, and whether there is a tendency to fluctuate between the two.

Figure 3:
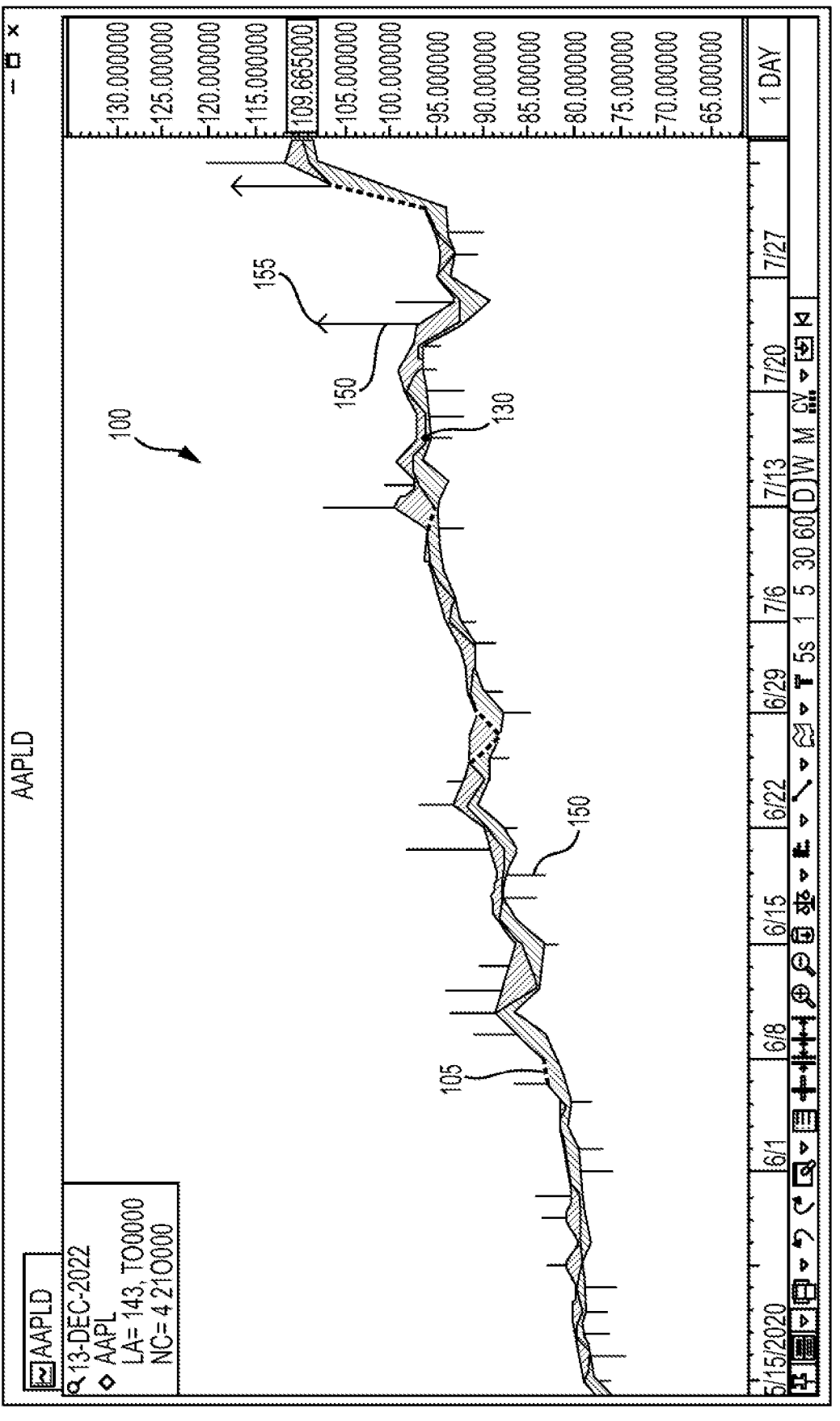
FIG. 3 shows a graph of an embodiment of the present invention, the graph including a plurality of graphical representations positioned on or extending from a band.

Referring to FIG. 3, some embodiments of the present invention include close lines 105, which are line segments representing consecutive periods in which the close values were within a selected percentage of respective high or low values (a "threshold range"). For instance, in some such embodiments, a line segment extends along an upper boundary between first and second dates if: 1) the close value for each such date is within a selected threshold range; and 2) the number of relevant days (i.e. days the market is open) is greater than or equal to a selected threshold length of time, such as three days, a week, or the like. Each close line 105 is positioned over a relative length of the band, thereby providing an indication of the existence of the information represented. By adjusting the selected threshold range and/ or the selected number of relevant days, close lines 105 are added and removed, accordingly. In some embodiments, each close line 105 is a fourth color, the fourth color being readily distinguishable from the first, second, and third colors.

Figure 4:
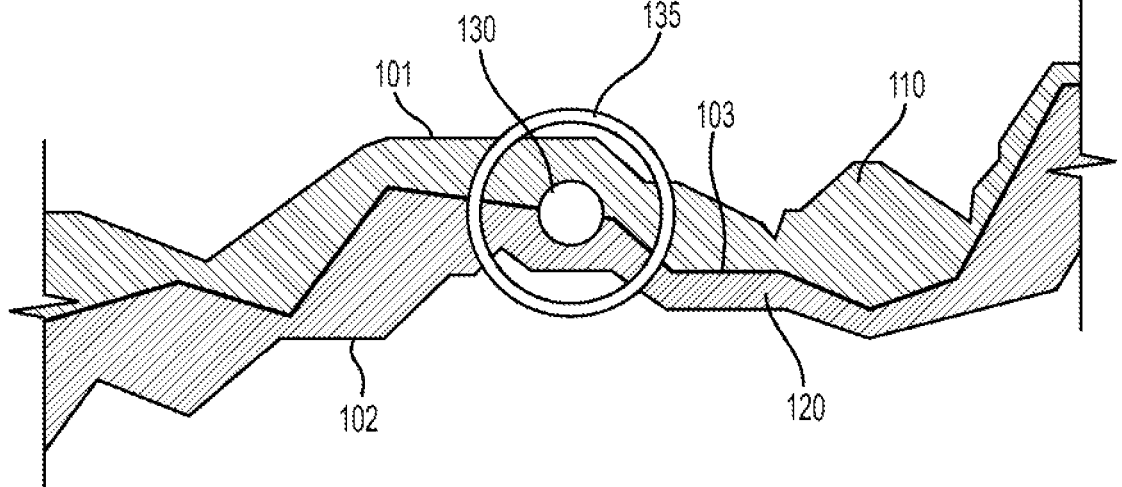
FIG. 4 is a partial view on an enlarged scale of a graph of the present invention.

Referring to FIGS. 3 and 4, some embodiments of the present invention include a body marker 130 to indicate a close value being within a selected threshold value (typically less than 5%) of a respective open value. By adjusting the selected threshold value, body markers 130 are added and removed, accordingly. In some embodiments, each body marker 130 is represented by a colored dot, such as an orange dot, positioned along the middle boundary 103. In some embodiments, the present invention includes a secondary marker 135 to indicate a close value being equal to a respective open value. In some such embodiments, a secondary marker 135 is a ring that encircles a respective body marker 130.

Still referring to FIG. 3, some embodiments of the present invention utilize a plurality of tails 150 extending from the band 100. In some embodiments, each tail 150 represents a sealed value, such as trade volume and/or a ratio of trade volume. In some such embodiments, the size of the tail 150 is determined by comparing a daily trade volume with a daily average trade volume over a first period of time, such as a month, a quarter, or a year. In some embodiments, the size of the tail 150 represents a percentage over or under a specified moving average period. In some embodiments, the graphical representation limits the size of each tail 150 such that the size of each tail 150 does not exceed a maximum size. In some such embodiments, a maximized tail 150 includes a max indicator 155, such as an arrow, indicating the same. For instance, some tails 150 include an upward-pointing arrow 155 to represent a value that is greater than 100%.

The plurality of tails 150 includes positive and negative tails 150. In some embodiments, each positive tail 150 extends above the band 100 and each negative tail 150 extends below the band 100. In this way, each positive tail is separated from each negative tail, and vice versa. In some embodiments, positive and negative tails 150 are represented by first and second colors, respectively, such as blue and red. In some embodiments, each tail 150 represents a value that exceeds or falls below an upper or lower threshold value, respectively. In some such embodiments, a tail 150 is omitted when associated data falls between the upper and lower threshold values.

Figure 5:
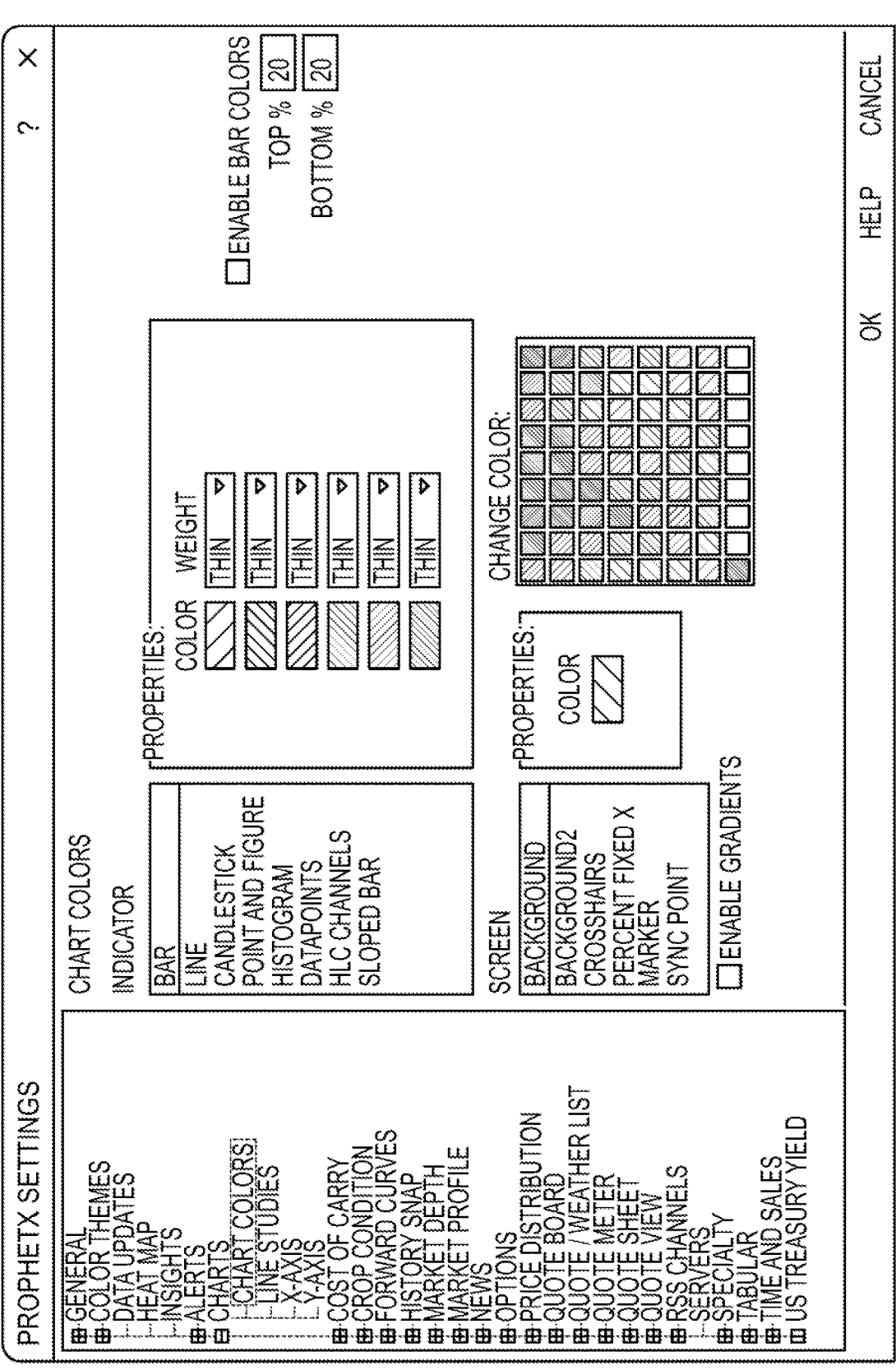
FIG. 5 shows a settings menu of an embodiment of the present invention, the settings menu for adjusting a plurality of parameters of the graphical representations.

Referring to FIGS. 5 and 6, in some embodiments, a system for generating the band 100 includes settings menus for adjusting the band 100, such as by adjusting threshold values and ranges, adjusting colors, adjusting shapes, and turning various options on or off. In some such embodiments, the various options include gradients, volume tails, body markers, secondary markers, close lines, and the like.

In specific embodiments, the present invention includes a system for creating a graphical representation of historical financial data. In some such embodiments, the system includes a band generator for generating a band associated with a scaled plot area. The system further includes a display mechanism for displaying the first band, the first band being positioned on the scaled plot area. The first band includes an upper boundary representing a plurality of high values for a tracked variable, and a lower boundary representing a plurality of low values for the tracked variable. The upper boundary provides a graphical representation of a series of high values, and the lower boundary provides a graphical representation of a series of low values such that the varying thicknesses of the band provides a graphical representation of associated value fluctuations.

In some embodiments, the system of the present invention includes a line segment generator for generating a close line. In some such embodiments, the line segment generator is also the band generator. Each close line includes a plurality of line segments, the number of line segments of the close line representing a number of consecutive days for which close values fall within a selected threshold range. Each line segment extends along a respective boundary of the band between respective dates. In particular, the line segment generator is configured to generate a close line when the number of consecutive days for which close values fall within the selected threshold range exceeds a threshold value.

In some embodiments, the system of the present invention includes a marker generator for generating a plurality of body markers. In some such embodiments, the marker generator is also the close line generator and/or the band generator. The marker generator is configured to generate a body marker when a close value is within a selected threshold value of a respective open value. In some such embodiments, each body marker is positioned on the band along a middle boundary of the band. In some embodiments, the marker generator is configured to generate a secondary marker when the close value is equal to the respective open value.

In some embodiments, the system includes a tail generator for generating à plurality of volume tails. In some such embodiments, the tail generator is also the close line generator, the band generator, and/or the marker generator. In some embodiments, the tail generator is configured to generate a volume tail when a daily trading volume exceeds a selected threshold value.

The present invention also includes a method of conveying information. In some embodiments, the method includes creating a graphical representation of historical financial data by generating a first band associated with a scaled plot area. In some such embodiments, the method includes positioning the band on the scaled area and displaying the same.

In some embodiments, the present inventive method further includes generating a close line and positioning the same on the band. In some such embodiments, generating the close line includes generating a plurality of line segments, each line segment extending between consecutive days for which close values fall within a selected threshold range. Each line segment is positioned so that it extends along a respective boundary between respective dates.

In some embodiments, the present inventive method further includes generating a body marker when a close value is within a selected threshold value of a respective open value. In some embodiments, each body marker is positioned on the band on the band at a respective date. In some such embodiments, each body marker is positioned along a middle boundary of the band. In some embodiments, the present inventive method further includes generating a secondary marker when a close value for a particular day is equal to the open value for that day. In some such embodiments, each secondary marker is positioned relative to a corresponding body marker, such as by positioning the secondary marker around and/or concentric with the corresponding body marker.

In some embodiments, the present inventive method further includes generating a volume tail when a daily trading volume exceeds a selected threshold value. In some such embodiments, each volume tail is positioned relative to the band and a respective date, such as by extending the volume tail from the band at the graphical representation of such date. In various embodiments, the method of the present invention combine additional graphical representations of additional information to further augment information conveyed by the band and its various portions and boundaries.

Various embodiments of the present invention utilize, encompass, or are facilitated by computer programs, devices, systems, methods, and the like. Various embodiments of computer programs, devices, systems, and methods are implemented in hardware, software, firmware, or combinations thereof, such as by using a central management system (e.g. TCS or other central computer control system), which broadly comprises server devices, computing devices, a communications network, and the like. Various embodiments of the server devices include computing devices that provide access to one or more general computing resources, such as Internet services, electronic mail services, data transfer services, and the like. In some embodiments the server devices also provide access to a database that stores information and data, with such information and data including, without limitation, system user information (e.g. project ID, account number, etc.), market information, or the like, or other information and data necessary and/or desirable for the implementation of the computer program, devices, systems, and methods of the present invention.

Various embodiments of server devices and computing devices include any device, component, or equipment with a processing element and associated memory elements. In some embodiments the processing element implements operating systems, and in some such embodiments is capable of executing a computer program, which is also generally known as instructions, commands, software code, executables, applications (apps), and the like. In some embodiments the processing element includes processors, microprocessors, microcontrollers, field programmable gate arrays, and the like, or combinations thereof. In some embodiments the memory elements are capable of storing or retaining the computer program and in some such embodiments also store data, typically binary data, including text, databases, graphics, audio, video, combinations thereof, and the like. In some embodiments the memory elements also are known as a "computer-readable storage medium" and in some such embodiments include random access memory (RAM), read only memory (ROM), flash drive memory, floppy disks, hard disk drives, optical storage media such as compact discs (CDs or CDROMs), digital video disc (DVD), Blu-Ray™, and the like, or combinations thereof. In addition to these memory elements, in some embodiments the server devices further include file stores comprising a plurality of hard drives, network attached storage, or a separate storage network.

Various embodiments of the computing devices specifically include mobile communication devices (including wireless devices), work stations, desktop computers, laptop computers, palmtop computers, tablet computers, portable digital assistants (PDA), smart phones, wearable devices and the like, or combinations thereof. Various embodiments of the computing devices also include voice communication devices, such as cell phones or landline phones. In some preferred embodiments, the computing device has an electronic display that is operable to display visual graphics, images, text, etc. In certain embodiments, the computer program of the present invention facilitates interaction and communication through a graphical user interface (GUI) that is displayed via the electronic display. The GUI enables the user to interact with the electronic display by touching or pointing at display areas to provide information to the user control interface, which is discussed in more detail below. In additional preferred embodiments, the computing device includes an optical device such as a digital camera, video camera, optical scanner, or the like, such that the computing device can capture, store, and transmit digital images and/or videos, bar codes or other identification information.

In some embodiments a computing device includes a user control interface that enables one or more users to share information and commands with the computing devices or server devices. In some embodiments, the user interface facilitates interaction through the GUI described above or, in other embodiments comprises one or more functionable inputs such as buttons, keyboard, switches, scrolls wheels, voice recognition elements such as a microphone, pointing devices such as mice, touchpads, tracking balls, styluses, or the like. Embodiments of the user control interface also include a speaker for providing audible instructions and feedback. Further, embodiments of the user control interface comprise wired or wireless data transfer elements, such as a communication component, removable memory, data transceivers, and/or transmitters, to enable the user and/or other computing devices to remotely interface with the computing device.

In various embodiments the communications network will be wired, wireless, and/or a combination thereof, and in various embodiments will include servers, routers, switches, wireless receivers and transmitters, and the like, as well as electrically conductive cables or optical cables. In various embodiments the communications network will also include local, metro, or wide area networks, as well as the Internet, or other cloud networks. Furthermore, some embodiments of the communications network include cellular or mobile phone networks, as well as landline phone networks, public switched telephone networks, fiber optic networks, or the like.

Various embodiments of both the server devices and the computing devices are connected to the communications network. In some embodiments server devices communicate with other server devices or computing devices through the communications network. Likewise, in some embodiments, the computing devices communicate with other computing devices or server devices through the communications network. In various embodiments, the connection to the communications network will be wired, wireless, and/or a combination thereof. Thus, the server devices and the computing devices will include the appropriate components to establish a wired or a wireless connection.

Various embodiments of computer programs associated with the present invention run on computing devices. In other embodiments an associated computer program runs on one or more server devices. Additionally, in some embodiments a first portion of the program, code, or instructions execute on a first server device or a first computing device, while a second portion of the program, code, or instructions execute on a second server device or a second computing device. In some embodiments, other portions of the program, code, or instructions execute on other server devices as well. For example, in some embodiments information is stored on a memory element associated with the server device, such that the information is remotely accessible to users of the computer program via one or more computing devices. Alternatively, in other embodiments the information is directly stored on a memory element associated with the one or more computing devices of the user. In additional embodiments of the present invention, a portion of the information is stored on the server device, while another portion is stored on the one or more computing devices. It will be appreciated that in some embodiments the various actions and calculations described herein as being performed by or using a computer program will actually be performed by one or more computers, processors, or other computational devices, such as the computing devices and/or server devices, independently or cooperatively executing portions of the computer program.

Various embodiments of the present invention are accessible via an electronic resource, such as an application, a mobile "app," or a website. In certain embodiments, portions of a computer program are embodied in a stand-alone program downloadable to a user's computing device or in a web-accessible program that is accessible by the user's computing device via the network. For some embodiments of the stand-alone program, a downloadable version of the computer program is stored, at least in part, on the server device. A user downloads at least a portion of the computer program onto the computing device via the network. After the computer program has been downloaded, the program is installed on the computing device in an executable format. For some embodiments of the web-accessible computer program, the user will simply access the computer program via the network (e.g., the Internet) with the computing device.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, various embodiments of the present technology include a variety of combinations and/or integrations of the embodiments described herein.

In the foregoing description, certain terms have been used for brevity, clearness and understanding; but no unnecessary limitations are to be implied therefrom beyond the requirements of the prior art, because such terms are used for descriptive purposes and are intended to be broadly construed. Moreover, the description and illustration of the inventions is by way of example, and the scope of the inventions is not limited to the exact details shown or described.

Although the foregoing detailed description of the present invention has been described by reference to an exemplary embodiment, and the best mode contemplated for carrying out the present invention has been shown and described, it will be understood that certain changes, modification or variations may be made in embodying the above invention, and in the construction thereof, other than those specifically set forth herein, may be achieved by those skilled in the art without departing from the spirit and scope of the invention, and that such changes, modification or variations are to be considered as being within the overall scope of the present invention. Therefore, it is contemplated to cover the present invention and any and all changes, modifications, variations, or equivalents that fall with in the true spirit and scope of the underlying principles disclosed and claimed herein. Consequently, the scope of the present invention is intended to be limited only by the attached claims, all matter contained in the above description and shown in the accompanying drawings shall be interpreted as illustrative and not in a limiting sense.

Having now described the features, discoveries and principles of the invention, the manner in which the invention is constructed and used, the characteristics of the construction, and advantageous, new and useful results obtained; the new and useful structures, devices, elements, arrangements, parts and combinations, are set forth in the appended claims.

It is also to be understood that the following claims are intended to cover all of the generic and specific features of the invention herein described, and all statements of the scope of the invention which, as a matter of language, might be said to fall therebetween.

What is claimed is:

1. A system for creating a graphical representation of historical financial data, the system comprising a processor configured for:

generating a first band associated with a scaled plot area;

displaying the first band, the first band being positioned on the scaled plot area; and generating a close line, the close line comprising a plurality of line segments that are determined by comparing close values of a number of consecutive days, wherein the first band comprises:

an upper boundary representing a plurality of high values for a tracked variable; and a lower boundary representing a plurality of low values for the tracked variable, wherein the upper boundary provides a graphical representation of a series of high values, wherein the lower boundary provides a graphical representation of a series of low values, wherein varying thicknesses of the band provides a graphical representation of associated value fluctuations, wherein a horizontal scale of the scaled plot area represents a period of time such that the upper and the lower boundaries of the band represent daily high and daily low values, respectively, wherein a vertical scale of the scaled plot area represents a price range such that the daily high and daily low values represent daily high and daily low prices, respectively, wherein the first band further comprises a middle boundary, the middle boundary separating the band into upper and lower portions, wherein the middle boundary represents a plurality of close values for the tracked variable such that the middle boundary provides a graphical representation of a series of close values, wherein the number of line segments of the close line represent a number of consecutive days for which close values fall within a selected threshold range, wherein line segments of the close line are added and removed, accordingly, by adjusting the selected threshold range or a selected number of relevant days, and wherein each line segment extends along the respective boundary between the respective dates.

2. The system of claim 1, wherein generating the close line occurs when the number of consecutive days for which close values fall within the selected threshold range exceeds a threshold value.

3. The system of claim 2, wherein the processor is further configured for generating a plurality of body markers when a close value is within a selected threshold value of a respective open value, wherein each body marker is positioned on the band along the middle boundary.

4. The system of claim 2, wherein the processor is further configured for generating a secondary marker when the close value is equal to the respective open value.

5. The system of claim 4, wherein the processor is further configured for generating a plurality of volume tails, each volume tail being associated with a daily trading volume that exceeds a selected threshold value.

6. A method of creating a graphical representation of historical financial data, the method comprising:

generating, using a processor, a first band associated with a scaled plot area;

displaying the first band using the processor, the first band being positioned on the scaled plot area; and generating a close line using the processor that compares close values of a number of consecutive days, the close line comprising a plurality of line segments, wherein the first band comprises:

an upper boundary representing a plurality of high values for a tracked variable; and a lower boundary representing a plurality of low values for the tracked variable, wherein the upper boundary provides a graphical representation of a series of high values, wherein the lower boundary provides a graphical representation of a series of low values, wherein varying thicknesses of the band provides a graphical representation of associated value fluctuations, wherein the first band further comprises a middle boundary, the middle boundary separating the band into upper and lower portions, wherein the middle boundary represents a plurality of close values for the tracked variable such that the middle boundary provides a graphical representation of a series of close values, wherein the number of line segments of the close line represents a number of consecutive days for which close values fall within a selected threshold range, wherein line segments of the close line are added and removed, accordingly, by adjusting the selected threshold range or a selected number of relevant days, and wherein each line segment extends along the respective boundary between the respective dates.

7. The method of claim 6, wherein a horizontal scale of the scaled plot area represents a period of time such that the upper and the lower boundaries of the band represent daily high and daily low values, respectively, and wherein a vertical scale of the scaled plot area represents a price range such that the daily high and daily low values represent daily high and daily low prices, respectively.

8. The method of claim 6, wherein a close line is generated when the number of consecutive days for which close values fall within the selected threshold range exceeds a threshold value.

9. The method of claim 8, further comprising generating a body marker when a close value is within a selected threshold value of a respective open value, wherein the body marker is positioned on the band along the middle boundary.

10. The method of claim 9, further comprising generating a secondary marker when the close value is equal to the respective open value.

11. The method of claim 10, further comprising generating a volume tail when a daily trading volume exceeds a selected threshold value.

12. A graphical representation of historical financial data and an electronic display displaying the same, the graphical representation comprising:

a first band positioned on a scaled plot area, wherein the first band comprises:

an upper boundary representing a plurality of high values for a tracked variable;

a lower boundary representing a plurality of low values for the tracked variable; and a middle boundary representing a plurality of close values for the tracked variable, the middle boundary separating the band into upper and lower portions, wherein the upper boundary provides a graphical representation of a series of high values, wherein the lower boundary provides a graphical representation of a series of low values, wherein the middle boundary provides a graphical representation of a series of close values, wherein varying thicknesses of the band provides a graphical representation of associated value fluctuations of the tracked variable, the tracked variable being an actual price, wherein a horizontal scale of the scaled plot area represents a period of time such that the upper and the lower boundaries of the band represent daily high and daily low values, respectively, wherein a vertical scale of the scaled plot area represents a price range such that the daily high and daily low values represent daily high and daily low prices, respectively, and wherein the graphical representation further comprises:

a close line comprising a plurality of line segments, the number of line segments of the close line representing a number of consecutive days for which close values fall within a selected threshold range, as determined by a processor that compares the close values of the number of consecutive days, wherein line segments of the close line are added and removed, accordingly, by adjusting the selected threshold range or a selected number of relevant days, and wherein each line segment extends along the respective boundary between the respective dates.

13. A graphical representation of historical financial data and an electronic display displaying the same, the graphical representation comprising:

a first band positioned on a scaled plot area, wherein the first band comprises:

an upper boundary representing a plurality of high values for a tracked variable;

a lower boundary representing a plurality of low values for the tracked variable; and a middle boundary representing a plurality of close values for the tracked variable, the middle boundary separating the band into upper and lower portions, wherein the upper boundary provides a graphical representation of a series of high values, wherein the lower boundary provides a graphical representation of a series of low values, wherein the middle boundary provides a graphical representation of a series of close values, wherein varying thicknesses of the band provides a graphical representation of associated value fluctuations of the tracked variable, the tracked variable being an actual price, wherein a horizontal scale of the scaled plot area represents a period of time such that the upper and the lower boundaries of the band represent daily high and daily low values, respectively, wherein a vertical scale of the scaled plot area represents a price range such that the daily high and daily low values represent daily high and daily low prices, respectively, and wherein the graphical representation further comprises:

a close line comprising a plurality of line segments, the number of line segments of the close line representing a number of consecutive days for which close values fall within a selected threshold range, as determined by a processor that compares the close values of the number of consecutive days;

a plurality of body markers positioned on the band along the middle boundary, each body marker representing a close value within a selected threshold value of a respective open value;

a secondary marker encircling a respective body marker, the secondary marker representing a close value being equal to a respective open value; and a plurality of volume tails extending from the band, each volume tail representing a daily trading volume that exceeds a selected threshold value, wherein line segments of the close line are added and removed, accordingly, by adjusting the selected threshold range or a selected number of relevant days, and wherein each line segment extends along the respective boundary between the respective dates.

* * * * *